United States Patent [19]

Iizawa

[11] Patent Number: 6,008,838
[45] Date of Patent: Dec. 28, 1999

[54] MULTI-POINT VIDEO CONFERENCE SYSTEM

[75] Inventor: Junichi Iizawa, Tokyo, Japan

[73] Assignee: NEC Corporation, Tokyo, Japan

[21] Appl. No.: 08/919,241

[22] Filed: Aug. 28, 1997

[30]     Foreign Application Priority Data

Aug. 29, 1996  [JP]  Japan ................................. 8-228492

[51] Int. Cl.$^6$ ..................................................... H04N 7/14
[52] U.S. Cl. ......................... 348/15; 379/93.21; 379/202
[58] Field of Search ................................. 348/14, 15, 16, 348/17, 18

[56]              References Cited

U.S. PATENT DOCUMENTS

| | | | |
|---|---|---|---|
| 4,650,929 | 3/1987 | Boerger et al. | 348/15 |
| 5,365,265 | 11/1994 | Sibata et al. | 348/17 |
| 5,539,741 | 7/1996 | Barraclough | 348/15 |
| 5,768,263 | 6/1998 | Tischler | 379/202 |
| 5,801,756 | 9/1998 | Hzawa | 348/16 |

FOREIGN PATENT DOCUMENTS 60-94572   5/1985   Japan .

OTHER PUBLICATIONS

"Multi–point Control Unit", NEC technical report, vol. 44, No. 6/1991, pp. 32–38.

*Primary Examiner*—Paul Loomis
*Assistant Examiner*—Melur Ramakrishnaiah
*Attorney, Agent, or Firm*—Whitham, Curtis & Whitham

[57]              ABSTRACT

A multi-point video conference system includes a plurality of CODECs which are set at multiple points and participate in a conference, and a multi-point control unit for transmitting/receiving voice signals and video signals between the CODECs. The multi-point control unit includes level measuring circuits, level adjusting circuits, an audio mixer, and a video signal processing circuit. The level measuring circuits measure the levels of voice signals input from the CODECs. The level adjusting circuits adjust the levels of the voice signals input from the CODECs to substantially the same level on the basis of the measurement results obtained by the level measuring circuits. The audio mixer adds the voice signals output from level adjusting circuits, and outputs a sum voice signal, from which the voice signal corresponding to each of the CODECs at transmission destinations is removed, to each of the CODECs. The video signal processing circuit performs signal processing for video signals input from the CODECs, and outputs the video signal from a talk CODEC to which a last talker belongs to all the CODECs.

6 Claims, 2 Drawing Sheets

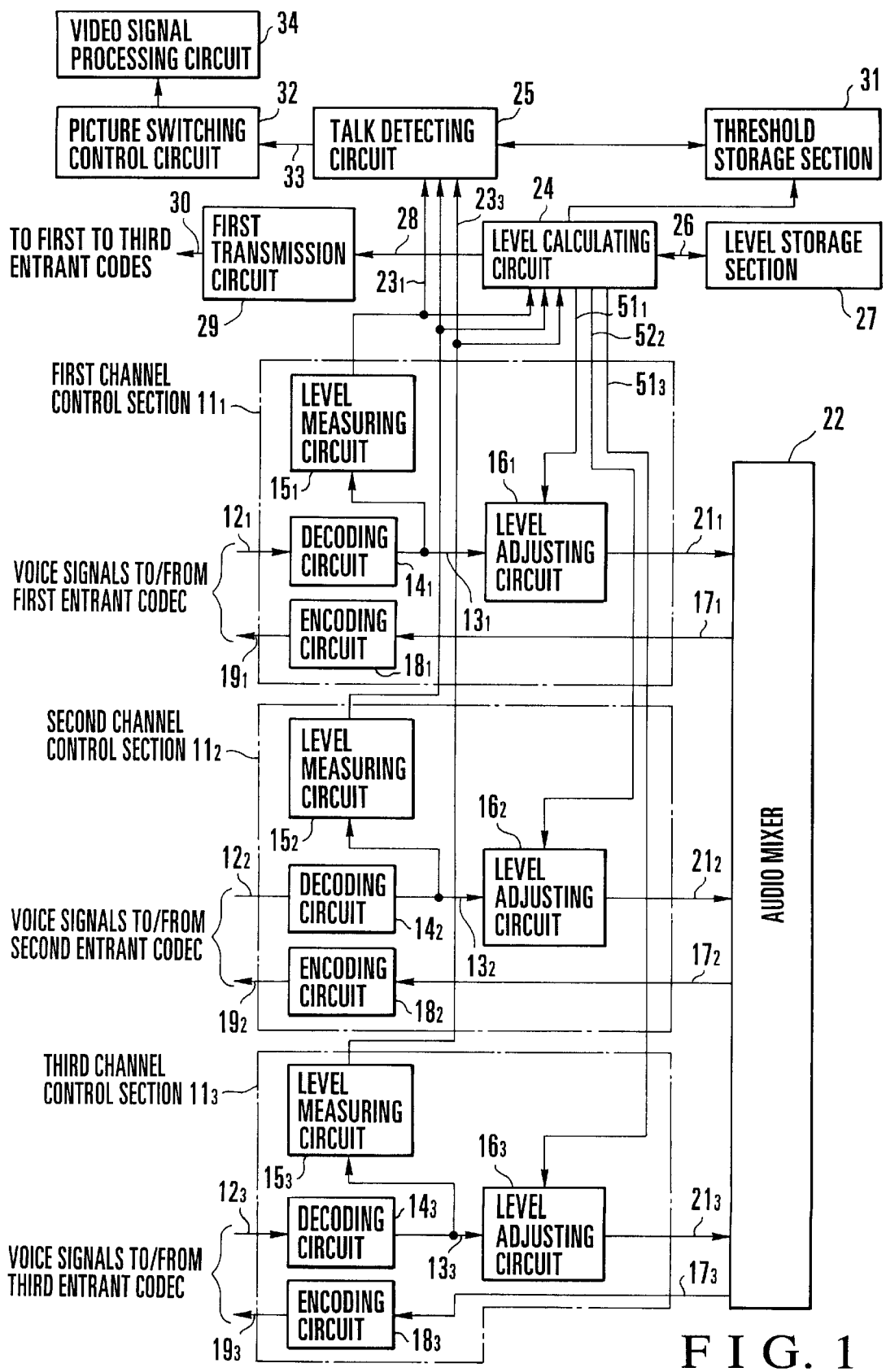
F I G. 1

MULTI-POINT VIDEO CONFERENCE SYSTEM

BACKGROUND OF THE INVENTION

The present invention relates to a multi-point video conference system for holding a video conference by linking multiple points and, more particularly, to a multi-point video conference system in which the voice levels of the respective entrant CODECs as participants in a video conference are adjusted.

With the use of a video conference system, each participant in a video conference can see pictures of other participants through a television set even if the participants are in different places. A great deal of attention has therefore been given to a video conference system as an effective means for realizing smooth communication between people in remote places. In a video conference system designed to hold a video conference between two points, smooth communication can be realized when each participant transmits video and voice data from the home station to the distant station. In a multi-point video conference system designed to hold a video conference among three or more points, a video conference is generally performed by using an MCU (Multi-point Control Unit) with the respective entrant CODECs being connected to the MCU in the form of a star connection configuration.

In this case, the MCU is an apparatus for collecting video and voice data from entrant CODECs and distributing the video and voice data to the respective entrant CODEC such that the respective participants can feel as if they were in the same conference room. In many cases, a picture from the CODEC to which the last talker belongs (to be referred to as the last talk CODEC hereinafter) is transmitted to the remaining entrant CODECs. As for voice data, voice data from talk CODECs are mixed and distributed to the respective entrant CODECs. In this case, if the mixed voice data are returned to all the entrant CODECs without any change, the voice data from each talk CODEC is output from its own speaker and input to its own microphone. As a result, howling occurs.

In such a conventional multi-point video conference system, to prevent howling, the following processing is performed. After mixing voice data from talk CODECs to obtain a mixed voice signal to be transmitted to each entrant CODEC, the MCU extracts a voice signal received from a CODEC as a transmission destination from the mixed voice signal, and transmits the resultant signal. That is, the MCU removes a voice signal received from a given talk CODEC from a mixed voice signal, and transmits the resultant signal to the talk CODEC. In this manner, each entrant CODEC receives the mixed voice signal obtained by removing its own voice data from the mixed voice signal obtained by mixing the voice data from the remaining entrant CODECs. For example, such a multi-point video conference system is disclosed in "Multi-point Control Unit", NEC technical report, Vol. 44, No. 6/1991, pp. 32–38 and Japanese Patent Laid-Open No. 60-94572.

The levels of voice data transmitted from the respective entrant CODECs to the MCU vary greatly depending on the magnitudes of the voices of the respective talkers at the talk CODECs, the distances from the talkers and the microphones, or system environments including the amount of amplification of the voice signals and the like. If, therefore, voice data from a given talk CODEC is mixed with voice data from the remaining entrant CODECs, and the mixed data is returned to the talk CODEC, the voice output level of the talk CODEC can be adjusted by comparing its voice level with the voice levels of the remaining entrant CODECs.

In the conventional multi-point video conference system, voice data from each talk CODEC is not returned thereto in consideration of howling. Voice signals input from the respective talk CODECs to the MCU vary considerably in level.

To switch pictures, the MCU specifies the last talk CODEC of a plurality of talk CODECs. Assume that an entrant CODEC A talked first, and an entrant CODEC B then talked in response to the talk given by the entrant CODEC A. In this case, the entrant CODEC B is the last talk CODEC. This last talk CODEC is specified by specifying a talk CODEC that outputs the maximum voice level at each time point, and detecting that the specified talk CODEC is replaced. As described above, however, voice data input from talk CODECs to the MCU may vary considerably in level.

If, therefore, a talk CODEC with a low voice level talks when a talk CODEC with a high voice level stops talking, the MCU may not recognize the replacement of the talk CODEC. As a result, the MCU may erroneously recognize the last talk CODEC to be specified. In this case, a picture of the participant at the entrant CODEC with a high voice level may be erroneously displayed as a picture of the participant at the current talk CODEC in spite of the fact that this talk CODEC is not the last talk CODEC.

SUMMARY OF THE INVENTION

It is an object of the present invention to provide a multi-point video conference system which can reduce the differences in level between voice signals from the respective points.

It is another object of the present invention to provide a multi-point video conference system which can reliably switch pictures of participants at talk CODECs without erroneously misidentifying the last talk CODEC.

In order to achieve the above objects, according to the present invention, there is provided a multi-point video conference system comprising a plurality of CODECs which are set at multiple points and participate in a conference, and a multi-point control unit for transmitting/receiving voice signals and video signals between the CODECs, the multi-point control unit including a plurality of voice level measuring means for measuring levels of voice signals input from the CODECs, a plurality of voice level adjusting means for adjusting the levels of the voice signals input from the CODECs to substantially the same level on the basis of the measurement results obtained by the voice level measuring means, mixing means for adding voice signals output from the voice level adjusting means, and outputting a sum voice signal, from which the voice signal corresponding to each of the CODECs at transmission destinations is removed, to each of the CODECs, and video signal processing means for performing signal processing for video signals input from the CODECs, and outputting the video signal from a talk CODEC to which a last talker belongs to all the CODECS.

BRIEF DESCRIPTION OF THE DRAWINGS

FIG. 1 is a block diagram showing the schematic arrangement of the MCU side of a multi-point video conference system according to an embodiment of the present invention.

DESCRIPTION OF THE PREFERRED EMBODIMENT

Figure 2:
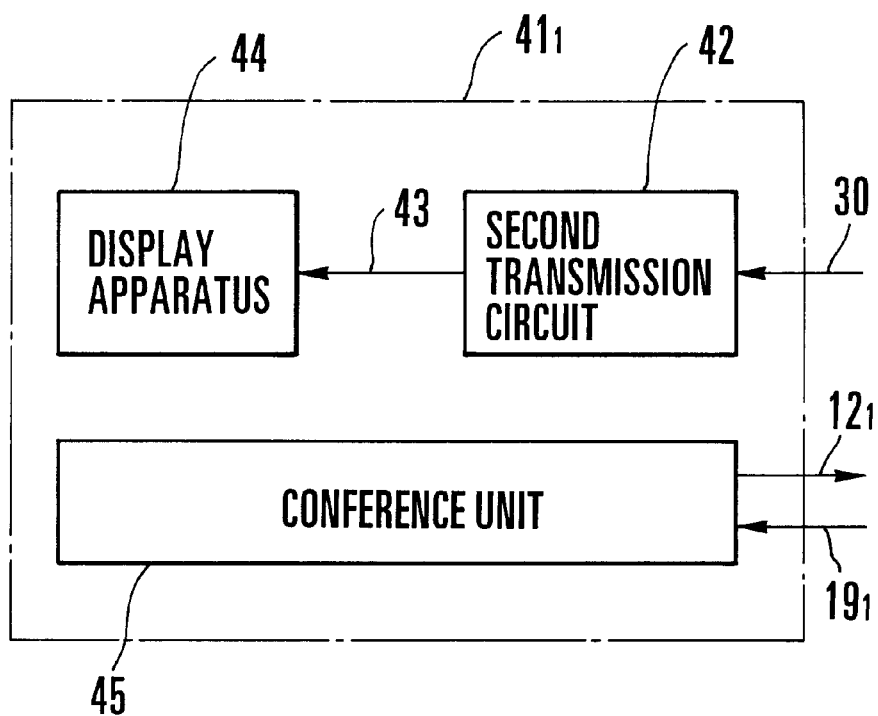
FIG. 2 is a block diagram showing the main part of the first entrant CODEC connected to the MCU in FIG. 1.

FIG. 1 shows the arrangement of the MCU side of a multi-point video conference system according to an embodiment of the present invention. FIG. 1 shows the main part of the voice signal system of the MCU which connects three entrant CODECs, the first to third entrant CODECs, to each other. An MCU 10 includes first to third channel control sections $11_1$ to $11_3$ respectively corresponding to the first to third entrant CODECs. The first to third channel control sections $11_1$ to $11_3$ respectively include decoding circuits $14_1$ to $14_3$ for decoding encoded voice signals $12_1$ to $12_3$ sent from the first to third entrant CODECs into voice signals $13_1$ to $13_3$ as PCM (Pulse Code Modulation) data, level measuring circuits $15_1$ to $15_3$ for measuring the levels of the voice signals $13_1$ to $13_3$, level adjusting circuits $16_1$ to $16_3$ for adjusting the levels of the voice signals $13_1$ to $13_3$, and encoding circuits $18_1$ to $18_3$ for encoding voice signals $17_1$ to $17_3$ obtained by mixing. Voice signals $19_1$ to $19_3$ encoded by the encoding circuits $18_1$ to $18_3$ are respectively set to the first to third entrant CODECs.

Voice signals $21_1$ to $21_3$ adjusted by the level adjusting circuits $16_1$ to $16_3$ are input to an audio mixer 22 to be summed for mixing. The audio mixer 22 subtracts the voice signals corresponding to the transmission destinations from the mixed voice signals $21_1$ to $21_3$ to output the voice signals $17_1$ to $17_3$ and distribute them to the encoding circuits $18_1$ to $18_3$. For example, the audio mixer 22 inverts the voice signals corresponding to the transmission destinations and adds them to the mixed signals, thereby subtracting the signals corresponding to the transmission destinations from the mixed signals. The voice signal $17_1$ sent to the first encoding circuit $18_1$ therefore corresponds to the sum of the second and third voice signals $21_2$ and $21_3$. This technique is a known signal processing technique of preventing howling.

The MCU 10 includes a level calculating circuit 24 and a talk detecting circuit 25, both of which receive voice level signals $23_1$ to $23_3$ output from the level measuring circuits $15_1$ to $15_3$. The level calculating circuit 24 periodically samples the voice level signals $23_1$ to $23_3$ supplied from the level measuring circuits $15_1$ to $15_3$, and calculates the averages of the sampled values in a predetermined period of time, thereby calculating the average levels of the respective entrant CODECs and the average level of all the entrant CODECs. Each calculated average level 26 is stored in a level storage section 27 and is sent as average level information 28 to a first transmission circuit 29. The first transmission circuit 29 sends the average level information 28 from the level calculating circuit 24 as average level information 30 to a corresponding one of the first to third entrant CODECs.

The talk detecting circuit 25 compares the voice level signals $23_1$ to $23_3$ output from the level measuring circuits $15_1$ to $15_3$ with each other, and recognizes a CODEC which meets the talk detection conditions as a talk CODEC. In this case, the talk detection conditions are predetermined conditions associated with the magnitude of an input level, the duration of a talk, and the like, by which a CODEC is recognized as a talk CODEC. The information of the talk detection conditions is stored in a threshold storage section 31. By referring to the information stored in the threshold storage section 31, whether the talk detection conditions are satisfied is determined. A picture switching control circuit 32 performs distribution control with respect to a video signal processing circuit 34 to send a picture of the participant at a designated talk CODEC by multi-address calling on the basis of a talk CODEC designating signal 33 output from the talk detecting circuit 25. The video signal processing circuit 34 encodes, decodes, selects, and distributes video signals.

FIG. 2 shows the schematic arrangement of the reception section of a first entrant CODEC $41_1$ connected to the MCU in FIG. 1. Although FIG. 2 shows only the arrangement of the first entrant CODEC $41_1$, the second and third entrant CODECs have the same arrangement as that of the first entrant CODEC. The first entrant CODEC $41_1$ includes a second transmission circuit 42 for receiving the average level information 30 sent from the first transmission circuit 29, a display apparatus 44 for displaying average level information 43 output from the second transmission circuit 42, and a known conference unit 45.

For example, the display apparatus 44 is composed of a video signal display and is designed to notify the user at the first entrant CODEC $41_1$ of the average voice level of each entrant CODEC and the average voice level of all the entrant CODECs. The conference unit 45 is composed of a television camera for taking pictures of a talker, a television set for displaying a conference, a microphone, a speaker, a signal transmission/reception circuit for transmitting/receiving the multiplexed voice signals $12_1$ and $19_1$ and video signals, a control circuit, and the like.

The operation of the multi-point video conference system having the above arrangement will be described next.

The encoded voice signal $12_1$ sent from the first entrant CODEC $41_1$ to the MCU 10 is demultiplexed from the encoded video signal by a multiplexing/demultiplexing circuit (not shown), and is input to the decoding circuit $14_1$ to be decoded into a PCM signal. The PCM voice signal $13_1$ output from the decoding circuit $14_1$ is input to the audio mixer 22 through the level adjustment circuit $16_1$ to be mixed with the voice signals $13_2$ and $13_3$ from the other entrant CODECs. The mixed signal from which the voice signal $21_1$ corresponding to the home station is subtracted is input as the voice signal $17_1$ to the encoding circuit $18_1$. Thereafter, the voice signal $17_1$ is multiplexed with the video signal encoded by the multiplexing/demultiplexing circuit (not shown), and the resultant signal is sent to the first entrant CODEC $41_1$. The voice signals output from the second and third entrant CODECs are also subjected to the same signal processing as described above, and the resultant signals are returned to the respective entrant CODECs.

The level measuring circuit $15_1$ converts the level of the input voice signal $13_1$ into a binary value. The level measuring circuit $15_1$ sends the voice signal $23_1$ to the level calculating circuit 24. The level calculating circuit 24 receives the voice level signals $23_2$ and $23_3$ converted into binary values and output from the level measuring circuits $15_2$ and $15_3$, together with the voice signal $23_1$. The level calculating circuit 24 periodically reads out these voice level signals $23_1$ to $23_3$, samples the input levels for a predetermined period of time, and calculates the average voice levels of the respective entrant CODECs $41_1$ to $41_3$. The calculated average levels are stored in the level storage section 27 in correspondence with the respective entrant CODECs $41_1$ to $41_3$.

The level calculating circuit 24 further calculates the average levels of all the entrant CODECs by comparing/calculating the average levels of the respective entrant CODECs $41_1$ to $41_3$. The calculated overall average level is stored in the level storage section 27, and level adjustment signals $51_1$ to $51_3$ are respectively sent to the level adjusting circuits $16_1$ to $16_3$. The level calculating circuit 24 controls the level adjusting circuits $16_1$ to $16_3$ to reduce the differences in average level between the respective entrant CODECs $41_1$ to $41_3$ by using the level adjustment signals $51_1$ to $51_3$.

If, for example, the average level of voice signals $12_1$ sent from the first entrant CODEC $41_1$ is higher than the overall average level stored in the level storage section 27, the level adjusting circuit $16_1$ is controlled to attenuate the level of the voice signal $12_1$. In contrast to this, if the average level of the voice signals $12_1$ is lower than the overall average level, the level adjusting circuit $16_1$ is controlled to bring the level of the voice signal $12_1$ close to the overall average level, thus increasing the gain. When level control is periodically repeated by the level adjusting circuits $16_1$ to $16_3$, the levels of the voice signals $21_1$ to $21_3$ output from the first to third entrant CODECs and input to the audio mixer 22 are brought close to a uniform level.

In this manner, in the MCU 10, the levels of the voice signals $12_1$ to $12_3$ sent from the first to third entrant CODECs are equalized before mixing. This level equalization process before mixing gradually progresses for each of the first to third entrant CODECs. As a result, a certain period of time is required until the levels of the voice signals $21_1$ to $21_3$ output from the level adjusting circuits $16_1$ to $16_3$ are equalized. For this reason, the average levels of voice signals sent from the first to third entrant CODECs and the average level information 30 indicating the average level of all the voice signals, which are stored in the level storage section 27, are sent from the first transmission circuit 29 to the first to third entrant CODECs.

In each of the first to third entrant CODECs, the average level information 43 corresponding to the average level information 30 received by the second transmission circuit 42 is displayed on the display apparatus 44. In accordance with the average level information 43 displayed on the display apparatus 44, each user can immediately know whether the voice level of the home entrant CODEC is higher or lower than the voice levels of the distant entrant CODECs. The respective users therefore adjust the levels of the voice signals $12_1$ to $12_3$ to a proper level. For example, the users control the volumes of voice or move the microphones farther away from them. As a result, the voice levels of the first to third entrant CODECs can be quickly equalized.

The voice level signals $23_1$ to $23_3$ output from the level measuring circuits $15_1$ to $15_3$ are input to the talk detecting circuit 25. The talk detecting circuit 25 compares/calculates the levels of the voice signals sent from the first to third entrant CODECs to determine the current talk CODEC. The talk detecting circuit 25 then outputs the talk CODEC designating signal 33 to the picture switching control circuit 32 so as to switch the currently displayed picture to a picture of the participant at the last talk CODEC on the basis of the determination result. The picture switching control circuit 32 controls the video signal processing circuit 34 selects a video signal from the video signals sent from the first to third entrant CODEC in accordance with the talk CODEC designating signal 33. In this case, voice signal level thresholds as criteria for determining talk CODECs are stored in the threshold storage section 31 in correspondence with the first to third entrant CODECs connected thereto. The thresholds stored in the threshold storage section 31 are sequentially read out to determine a talk CODEC. As the thresholds set in correspondence with the first to third entrant CODECs, equal default values are set in the initial state before a conference. These values are sequentially changed on the basis of the calculation results of the average levels of the first to third entrant CODECs, which are obtained by the level calculating circuit 24.

If, therefore an input level is higher than the average level, the threshold for talk detection is increased to make it difficult to detect a talk. In contrast to this, if the input level is lower than the average level, the threshold is decreased to make it easy to detect a talk. Such threshold control is periodically repeated for each of the first to third entrant CODECs to impartially detect a talk without being influenced by the volumes of voice.

In the above embodiment, the multi-point video conference system is composed of the three entrant CODECs. As is obvious, however, a multi-point video conference system may be composed of four or more entrant CODECs.

In the above embodiment, the level measuring circuits $15_1$ to $15_3$ measure the levels of voice signals by using the voice signals $13_1$ to $13_3$ before they are adjusted by the level adjusting circuits $16_1$ to $16_3$, and the talk detecting circuit 25 determines a talk CODEC on the basis of the outputs form the level measuring circuits $15_1$ to $15_3$. However, the talk detecting circuit 25 may determine a talk CODEC on the basis of the levels of the voice signals $21_1$ to $21_3$ after they are adjusted by the level adjusting circuits $16_1$ to $16_3$. In this case, since the voice signals $21_1$ to $21_3$ adjusted by the level adjusting circuits $16_1$ to $16_3$ are used, a talk CODEC can be determined on the basis of the voice signal levels equalized more.

As has been described above, according to the present invention, when people with loud and gentle voices hold a video conference using the same system, since the output levels of voice are equalized, each talker can be easily recognized, and the contents of the conference are easy to hear as a whole.

In addition, the averages of the levels of voice signals from the respective entrant CODECs are periodically calculated, the levels of voice signals can be adjusted in accordance with variations in average, thereby properly coping with variations in environment of each entrant CODEC.

Furthermore, since the average of the input voice levels of each entrant CODEC and the average of the input voice levels of all the entrant CODECs are notified to all the entrant CODECs at predetermined intervals, the balance between the voice levels of the talkers can be quickly adjusted on each entrant CODEC side. In addition, since the user knows the states of the distant entrant CODECs as well as the state of the home entrant CODEC, balanced volume correction can be performed. When notification is visually performed by using the display, the user can easily and intuitively understand the contents of the notification, thus effectively making the user pay attention to the voice level.

Furthermore, since a threshold for determining a talk CODEC is set and changed in each entrant CODEC, a talk can be accurately determined even before the levels of voice signals from the respective entrant CODECs are satisfactorily equalized.

What is claimed is:

1. A multi-point video conferencing system comprising:
 a plurality Of CODECs which are set at multiple points and participate in a conferences; and
 a multi-point control unit for transmitting/receiving voice signals and video signals between said CODECs, said multi-point control unit including
  a plurality of voice level measuring means for measuring levels of voice signals input from said CODECs and for outputting a corresponding plurality of measurement results representing the levels of said voice signals;

voice level adjusting means, for receiving said plurality of voice signal levels and said voice signals input from said CODECs, and for outputting a plurality of adjusted voice signals in response, said adjusted voice signals being adjusted to substantially the same level in response to the measurement results obtained by said voice level measuring means;

mixing means for adding the adjusted voice signals output from said voice level adjusting means, and outputting a sum voice signal, from which the voice signals corresponding to each of said CODECs at transmission destinations is removed, to each of said CODECs; and video signal processing means for performing signal processing for video signals input from said CODECs, and outputting the video signal from a talk CODEC to which a last talker belongs to all said CODECs.

2. A system according to claim 1, wherein said multi-point control unit comprises:

average calculating means for calculating a first average of voice signal levels of each of said CODECs and a second average of voice signal levels of all said CODECs at predetermined intervals on the basis of the voice signal levels from said voice level measuring means; and average storage means for storing the first and second averages from said average calculating means, and updating the averages at predetermined intervals, and said voice level adjusting means adjusts the levels of voice signals sent from said CODECs to bring the levels close to the second average stored in said average storage means.

3. A system according to claim 2, wherein said multi-point control unit comprises notifying means for notifying all said CODECs of the first and second averages from said average calculating means, and each of said CODECs comprises display means for displaying the first and second averages from said notifying means.

4. A system according to claim 2, wherein said multi-point control unit comprises:

threshold storage means for storing the first average from said average calculating means as a threshold at predetermined intervals;

talk CODEC detecting means for detecting a last talk CODEC on the basis of the threshold stored in said threshold storage means; and picture switching control means for performing switching control on said video signal processing means on the basis of a detection output from said talk CODEC detecting means.

5. A system according to claim 1, wherein said multi-point control unit comprises:

a plurality of decoding means for decoding encoded voice signals from said CODECs and outputting the decoded signals to said voice level measuring means and said voice adjusting means; and a plurality of encoding means for encoding the voice signals output from said mixing means and outputting the encoded signals to said CODECs.

6. A multi-point video conference system comprising a plurality of CODECs which are set at multiple points and participate in a conference, and a multi-point control unit for transmitting/receiving voice signals and video signals between said CODECs, said multi-point control unit including:

a plurality of voice level measuring means for measuring levels of voice signals input from said CODECs;

average calculating means for calculating a first average of voice signal levels of each of said CODECs and a second average of voice signal levels of all said CODECs at predetermined intervals on the basis of the voice signal levels from said voice level measuring means; and notifying means for notifying all said CODECs of the first and second averages from said average calculating means.

* * * * *